United States Patent [19]

Mitchell et al.

[11] Patent Number: 4,814,384

[45] Date of Patent: Mar. 21, 1989

[54] TIRE HAVING TREAD COMPOSITION COMPRISED OF EPDM/UNSATURATED RUBBER BLEND

[75] Inventors: Julian M. Mitchell, North Haven; Donald E. Wingrove, Cheshire; Charles F. Eckert, Woodbridge, all of Conn.

[73] Assignee: Uniroyal Chemical Company, Inc., Middlebury, Conn.

[21] Appl. No.: 863,264

[22] Filed: May 14, 1986

[51] Int. Cl.$^4$ .......................... B60C 1/00; C08L 7/00; C08L 9/00; C08L 23/16

[52] U.S. Cl. .............................. 525/211; 152/209 R; 525/237

[58] Field of Search .............................. 525/211, 237; 152/209 R

[56] References Cited

U.S. PATENT DOCUMENTS

| | | | |
|---|---|---|---|
| 3,179,718 | 4/1965 | Wei et al. | 260/889 |
| 3,299,175 | 1/1967 | Marchesini et al. | 260/876 |
| 3,343,582 | 9/1967 | Himes et al. | 152/330 |
| 3,524,826 | 8/1970 | Kresge et al. | 260/5 |
| 3,678,135 | 7/1972 | Mastromatteo et al. | 260/889 |
| 3,817,952 | 6/1974 | Knabeschuh et al. | 260/80.78 |
| 3,897,405 | 7/1975 | Son et al. | 260/79.5 |
| 3,915,907 | 10/1975 | Hopper | 260/5 |
| 3,936,430 | 2/1976 | Schoen et al. | 260/80.78 |
| 3,937,862 | 2/1976 | Schneider | 428/409 |
| 3,938,574 | 2/1976 | Burmester et al. | 525/211 |
| 3,956,247 | 5/1976 | Landi et al. | 526/42 |
| 4,008,190 | 2/1977 | Taylor et al. | 260/5 |
| 4,017,468 | 4/1977 | Hopper | 260/79.5 |
| 4,195,013 | 3/1980 | de Zarauz | 260/42.33 |
| 4,202,801 | 5/1980 | Petersen | 260/5 |
| 4,350,795 | 9/1982 | Bohm et al. | 525/194 |
| 4,485,205 | 11/1984 | Fujimaki et al. | 525/237 |

OTHER PUBLICATIONS

J. Walker et al, "Specialty Elastomers in Tires", *Elastomerics*, Sep. 1985, pp. 22-29.

*Primary Examiner*—Allan M. Lieberman
*Attorney, Agent, or Firm*—Raymond D. Thompson

[57] ABSTRACT

Tires having a tread composed of a composition formed by curing a blend comprised of (A) ethylene/alpha-olefin/nonconjugated polyene terpolymer; (B) a highly unsaturated rubber; and (C) a curative system comprised of sulfur and/or a sulfur-donor compound, an organic (hydro)peroxide curative and a sulfur cure accelerator exhibit desirable high strength, low rolling resistance, high skid resistance and good traction.

6 Claims, No Drawings

TIRE HAVING TREAD COMPOSITION COMPRISED OF EPDM/UNSATURATED RUBBER BLEND

FIELD OF THE INVENTION

This invention relates to a tire having a tread composed of a composition formed by curing a blend comprised of (A) ethylene/alphaolefin/nonconjugated polyene terpolymer; (B) a highly unsaturated rubber; and (C) a curative system comprised of sulfur and/or a sulfur-donor compound, an organic (hydro)peroxide curative and a sulfur cure accelerator.

BACKGROUND OF THE INVENTION

The treads of modern tires must meet performance standards which require a broad range of desirable properties. Thus, rubber compositions suitable for tire treads should exhibit not only desirable strength and elongation, particularly at high temperatures, but also good cracking resistance, good abrasion resistance, desirable skid resistance and low tan delta values at low frequencies for desirable rolling resistance. Additionally, a high complex dynamic modulus is necessary for maneuverability and steering control.

It has been recognized that this complex balance of properties, required in the modern tire, cannot be satisfied by a single polymer and that, therefore, a blend of polymers must be employed. See, e.g., J. Walker et al, "Specialty Elastomers in Tires", *Elastomerics,* September 1985, pp. 22–29. It is noteworthy that all of the polymers employed in the blends described in such article possess a high degree of unsaturation. Consequently, such blends are readily vulcanized by the use of accelerated sulfur curative systems.

Ethylene/alphaolefin/nonconjugated diene terpolymers ("EPDM") are well known to have a significant advantage in their resistance to aging and to oxidation, because of their low degree of unsaturation and the position of the unsaturation which is not in the polymer backbone. Moreover, other advantages of using EPDM in treads include a high dynamic modulus for steering control and a low tan delta value at low frequencies for desirable rolling resistance.

However, it is well established that tire treads employing EPDM as the sole polymer are deficient in skid resistance. See, e.g., U.S. Pat. No. 4,195,013 to de Zarauz. Moreover, due to the low unsaturation of EPDM, it is difficult to adhere such a tread to tire carcasses composed of unsaturated rubbers.

In the past, covulcanizates of EPDM and highly unsaturated rubbers have generally exhibited poor strength and high hysteresis when cured with conventional accelerated sulfur vulcanization systems. Accordingly, several different approaches have been undertaken to find a method of achieving a desirable covulcanization of blends of rubber of varying degrees of saturation, particularly blends of highly unsaturated rubbers and EPDM.

One frequently employed approach has been to halogenate the highly saturated rubber (typically "EPDM") thereby rendering a blend of such halogen-modified rubber with an unsaturated rubber sulfur curable. Thus, Schoen et al (U.S. Pat. No. 3,936,430) shows sulfur-curable blends of halogenated EPDM with unsaturated rubbers. (It is noteworthy that Schoen et al indicate at Column 4, lines 45–46 that the use of peroxide is "unnecessary".) Similarly, Hopper (U.S. Pat. No. 4,017,468) shows sulfur-curable blends of N-chlorothiocarboxylic amides or imides with unsaturated rubbers, whereas Kresge et al (U.S. Pat. No. 3,524,826) discloses sulfur-cured covulcanizates of brominated EPDM and highly unsaturated rubbers. In the same vein, Landi et al (U.S. Pat. No. 3,956,247) show a sulfur-curable blend of halogenated EPDM and diene rubber, and Hopper (in U.S. Pat. No. 3,915,907) shows sulfur curable blends of N-chlorothiosulfonamide-modified EPDM and diene rubbers.

Somewhat similarly, Son et al (in U.S. Pat. No. 3,897,405) show blends of (i) EPDM having —SH or —S—N linkages grafted thereto, with (ii) highly unsaturated rubbers, which blends are sulfur curable.

A second general approach taken to achieve the cocure of otherwise incompatible rubbers involves the use of a particular sulfur-cure accelerator or combination of sulfur-cure accelerators in conjunction with the use of sulfur. Thus, Mastromatteo et al (in U.S. Pat. No. 3,678,135) show the use of long chain hydrocarbon dithiocarbamate accelerators, such as zinc N-dodecyl, N-isopropyl dithiocarbamate in the sulfur cure of EPDM with highly unsaturated rubbers, while, similarly, Taylor et al (in U.S. Pat. No. 4,008,190) show the sulfur cure of EPDM with highly unsaturated diene rubbers employing a N,N-(higher alkyl)thiocarbamylsulfenamide as a vulcanization accelerator. In a similar manner, Hines et al (in U.S. Pat. No. 3,343,582) disclose a vulcanizable composition comprised of polyisoprene and EPDM, which composition contains as cure accelerators a benzothiazyl sulfide compound, an aryl-substituted guanidine and a thiuram sulfide.

Other approaches taken in the past to achieve such a cocure include that of Knabeschuh et al (in U.S. Pat. No. 3,817,952) which involves preparing a branched EPDM by heating EPDM with sulfur or a peroxide, and then blending such branched EPDM with a diene to form a sulfur or peroxide curable composition; that of Marchesini et al (U.S. Pat. No. 3,299,175) which employs the polymerization product of divinyl benzene and a vinyl unsaturated polymer as a filler for a peroxide-curable ethylene/alphaolefin copolymer (although Marchesini does state that sulfur can be employed in addition to peroxide, all Examples show peroxide only); and that of Wei et al (U.S. Pat. No. 3,179,718) which shows a vulcanized blend of nitrile rubber and ethylene/propylene copolymer which blend has been vulcanized employing both an organic peroxide and elemental sulfur. (It is noteworthy that Wei et al mentions neither EPDM nor sulfur cure accelerators.)

Both Bohm et al (U.S. Pat. No. 4,350,795) and Petersen (U.S. Pat. No. 4,202,801) show thermoplastic elastomers comprised of blends of a polyalphaolefin, EPDM and a conjugated diene rubber. While both these patents state that combination of sulfur and peroxide may be employed, Bohm et al show the use of sulfur only while Petersen exemplifies the use of peroxide only. Moreover, it is readily apparent that thermoplastic elastomers, due to their thermoplastic nature, are unsuitable for use as tire tread compositions.

Thus, it would be desirable to possess a tire having a tread composition which exhibits desirable strength and elongation as well as desirable rolling resistance, and anti-skid and tractive properties.

Accordingly, it is an object of this invention to provide a tire having a tread composition which exhibits desirable strength and elongation as well as desirable rolling resistance, anti-skid and tractive properties.

It is a further object of this invention to provide a tire having a tread composition comprised of a covulcanizate of a highly unsaturated and saturated rubber.

These objects, and other additional objects will become more apparent from the following description and accompanying Examples.

DESCRIPTION OF THE INVENTION

This invention is directed to a tire having a tread composed of a composition formed by curing a blend comprised of:
(A) a terpolymer of:
  (i) ethylene,
  (ii) an alphaolefin of the formula $H_2C=CHR$ wherein R is an alkyl radical comprising from 1 to 10 carbon atoms, and
  (iii) a nonconjugated polyene;
(B) a highly unsaturated rubber; and
(C) a curative system comprised of:
  (i) one or more members selected from the group consisting of sulfur and sulfur-donor compounds;
  (ii) an organic peroxide curative; and
  (iii) a sulfur cure accelerator.

As is employed in the specification and claims herein, the term "organic peroxide" includes hydroperoxide curatives as well as peroxide curatives.

The tire tread compositions of the tires of this invention are formed by curing blends of (A) ethlyene/alphaolefin/nonconjugated polyene terpolymer and (B) a highly unsaturated rubber.

The ethylene/alphaolefin/nonconjugated polyene terpolymers, i.e., Component (A), which may be employed are terpolymers of ethylene, at least one alphaolefin (of the formula $H_2C=CHR$, wherein R is a linear or branched alkyl radical comprised of from 1 to 10 carbon atoms) and at least one copolymerizable nonconjugated polyene. Preferably, in the formula above, R is a $C_1$–$C_8$ alkyl radical. The most preferred alphaolefins are propylene, 1-butene and 1-pentene, with propylene being particularly preferred.

Illustrative of the nonconjugated polyenes which may be employed are aliphatic dienes such as 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, exo- and endo-dicyclopentadiene and the like; exo- and endo-alkenylnorbornenes, such as 5-propenyl-, 5-(buten-2-yl)-, and 5-(2-methylbuten-[2']-yl)norbornene and the like; alkylalkenylnorbornenes, such as 5-methyl-6-propenylnorbornene and the like; alkylidenenorbornenes, such as 5-methylene-, 5-ethylidene-, and 5-isopropylidene-2-norbornene, vinylnorbornene, cyclohexenylnorbornene and the like; alkylnorbornadienes, such as methyl-, ethyl-, and propylnorbornadiene and the like; and cyclodienes such as 1,5-cyclooctadiene, 1,4-cyclooctadiene and the like. The preferred nonconjugated polyenes are 5-ethylidene-2-norbornene, 1,4-hexadiene and dicyclopentadiene.

The ethylene to alphaolefin weight ratio of the ethylene/alphaolefin/nonconjugated polyene terpolymers which may be employed in the present invention is generally between about 25:75 and about 85:15, is preferably between about 40:60 and about 80:20, and is most preferably between about 60:40 and about 80:20. The polyene content of such terpolymers is generally below about 25%, and is preferably between about 1 and about 15% by weight.

Representative of the highly unsaturated rubbers which may be employed in the practice of this invention are diene rubbers. Such rubbers will typically possess an iodine number of between about 100 and about 250, although highly unsaturated rubbers having a higher or a lower (e.g., of 50–100) iodine number may also be employed. Illustrative of the diene rubbers which may be utilized are polymers based on conjugated dienes such as 1,3-butadiene; 2-methyl-1,3-butadiene; 1,3-pentadiene; 2,3-dimethyl-1,3-butadiene; and the like, as well as copolymers of such conjugated dienes with monomers such as styrene, alpha-methylstyrene, acrylonitrile, methacrylonitrile, methyl acrylate, ethyl acrylate, methyl methacrylate, ethyl methacrylate, vinyl acetate and the like. Preferably highly unsaturated rubbers include natural rubber, cis-polyisoprene, polybutadiene, poly(styrene-butadiene) and poly(acrylonitrile-butadiene). Moreover, mixtures of two or more highly unsaturated rubbers may be employed.

The curative system employed in the cure of the tread composition of this invention comprises sulfur and/or a sulfur donor compound, at least one sulfur cure accelerator and at least one organic peroxide curative.

The sulfur donor compounds which may be employed in conjunction with or in the alternative to sulfur are well known to those skilled in the art of rubber compounding. Illustrative of such sulfur donor compounds are 2-(4-morpholinyldithio)benzothiazole, tetramethylthiuram disulfide, tetraethylthiuram disulfide, dipentamethylene thiuram hexasulfide, N,N'-carpolactam disulfide and the like.

The sulfur cure accelerators which may be employed include thioureas, such as N,N'-dibutylthiourea, 2-mercaptoimidazoline, tetramethylthiourea and the like; guanidine derivatives, such as N,N'-diphenylguanidine and the like; xanthates, such as zinc dibutylxanthate and the like; dithiocarbamates, such as zinc dimethyldithiocarbamate, zinc diethyldithiocarbamate, zinc dibutyldithiocarbamate, sodium diethyldithiocarbamate, and the like; thiuramsulfides, such as dipentamethylenethiuram disulfide, dipentamethylenethiuram hexasulfide, tetrabutylthiuram monosulfide, tetramethylthiuram monosulfide, tetraethylthiuram monosulfide, tetraethylthiuram disulfide and the like; heterocyclics, such as mercaptobenzimidazole, mercaptobenzthiazole, 2,2'-dibenzothiazyl disulfide, zinc 2-mercaptobenzothiazole and the like; and sulfenamides, such as N-oxydiethylene-2-benzothiazolesulfenamide, N-t-butylbenzothiazylsufenamide, N-cyclohexyl-2-benzothiazylsulfenamide, N,N-diisopropyl-2-benzothiazylsulfenamide and the like. Moreover, mixtures of two or more sulfur cure accelerators may be employed in the curing agent of this invention. The preferred accelerators are thiazoles and sulfenamides, with sulfenamides being particularly preferred.

Illustrative of the peroxides which may be employed are benzoyl peroxide, 1,3-bis(t-butylperoxyisopropyl)-benzene, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and the like. Mixtures of two or more peroxides may also be employed. The preferred peroxides are dicumyl peroxide and 2,5-dimethyl-2,5-di-t-butylperoxyhexane.

Typically, between about 0.5 and about 200, preferably between about 5 and about 150, and most preferably between about 6 and about 14, gram atoms of sulfur per mole of peroxide are present in said curing agent.

The sulfur cure accelerator is generally present in amounts of between about 0.1 gram and about 5 grams per 100 grams of rubber, with preferably between about 0.3 gram and about 3.0 grams of accelerator per 100 grams of rubber being present. Most preferably, between about 0.3 gram and about 1.0 gram of accelerator per 100 grams of rubber are employed.

Generally, between about 0.2 and about 5, preferably between about 0.5 and about 3, and more preferably between about 0.5 and about 1.5 grams of sulfur per hundred grams of rubber are employed. Employing the ratios of sulfur to peroxide stated above, one skilled in the art can easily calculate the corresponding amount of the particular peroxide which is to be employed.

The weight ratio of ethylene/alphaolefin/nonconjugated polyene terpolymer to highly unsaturated rubber will generally vary between about 10:90 and about 90:10. Ratios of between about 30:70 and about 50:50 are preferred, although, as will be recognized by one skilled in the art, the preferred ratio will vary with the particular use to which the tread is to be applied.

In addition to the ethylene/alphaolefin/nonconjugated polyene terpolymer, the highly unsaturated rubber and the three-component curing agent described above, the tread composition of the tire of this invention may further comprise zinc oxide, reinforcing agents, fillers, processing aids, extender oils, plasticizers, antidegradients, and the like, all of which additional components are well known to those skilled in the rubber art.

Preferably, between about 2 and about 10 grams of zinc oxide per hundred grams of rubber are employed, although amounts in excess of 10 grams may also be employed. Most preferably, between about 3 and about 5 grams of zinc oxide per 100 grams of rubber are present.

The tread composition of this invention is typically compounded by first mixing all the ingredients except the curative composition in a suitable mixing device (such as a Banbury [trademark] type internal mixer, a two roll mill, or the like). Such mixing will typically require about 5 minutes, although shorter or longer mixing periods may be employed. This mixing may be performed at temperatures ranging from room temperature or cooler up to about 150° C. or higher. If mixing temperatures above the activation temperature of the curing agent are employed, upon completion of the mixing the blended rubber is cooled or allowed to cool to a temperature below such activation temperature. The curative composition is then incorporated into the blend by subsequent mixing or milling.

Alternatively, the blend of this invention may be compounded by formulating a terpolymer component and an unsaturated rubber component and blending desired amounts of the two components together. In this alternative embodiment, the location of the elements of the curative composition (i.e. the peroxide, sulfur and sulfur cure accelerator) is not critical, with any or all such elements being blended in either component or both.

The blended composition may then be extruded through a suitable die to form an uncured tread slab which is used by means well known to those skilled in the art to produce the tires of this invention.

The tires of this invention possess a tread composition exhibiting desirable strength and durability. Moreover, such tires have desirable rolling resistance, skid resistance and handling characteristics.

EXAMPLES

The following Examples are intended to further illustrate the invention and are not intended to limit the scope of the invention in any manner.

EXAMPLES 1-6 AND COMPARATIVE EXPERIMENTS A-F

Employing the ingredients indicated in Table I (which are listed in parts per hundred of rubber by weight), several rubber compositions were compounded in the following manner: Elastomers, extender oil (Naphthenic Oil, Circosol, 4240), carbon black (N-351), zinc oxide, stearic acid and an antioxidant in the amounts listed in Table I were charged in a Banbury type B internal mixer. Mixing was continued until the temperature reached 154° C., then the mixing was stopped and the inside of the mixer was swept. Blending was then resumed for one more minute and the stock was removed from the mixer. The curative ingredients were incorporated in the cooled rubber stocks on a mill, with care being taken not to exceed 105° C. stock temperature. The compounded stock was then sheeted out and samples were cut for cure. The samples were cured for 20 minutes at 170° C. and their physical properties evaluated. The results of such testing is summarized in Table II below. Examples 1-6 employ the tricure system of this invention whereas Comparative Experiments A-F employ conventional sulfur/sulfur cure accelerator cure compositions.

TABLE I

| Example or Comparative Experiment | A | 1 | B | 2 | C | 3 | D | 4 | E | 5 | F | 6 |
|---|---|---|---|---|---|---|---|---|---|---|---|---|
| NR[1] | 25 | 25 | 50 | 50 | 75 | 75 | — | — | — | — | 25 | 25 |
| SBR[2] | — | — | — | — | — | — | 50 | 50 | 25 | 25 | 25 | 25 |
| EPDM[3] | 75 | 75 | 50 | 50 | 25 | 25 | 50 | 50 | 75 | 75 | 50 | 50 |
| Extender Oil | 10 | 10 | 10 | 10 | 10 | 10 | 10 | 10 | 10 | 10 | 10 | 10 |
| Carbon Black, N-351 | 50 | 50 | 50 | 50 | 50 | 50 | 50 | 50 | 50 | 50 | 50 | 50 |
| Zinc Oxide | 5 | 5 | 5 | 5 | 5 | 5 | 5 | 5 | 5 | 5 | 5 | 5 |
| Stearic Acid | 1 | 1 | 1 | 1 | 1 | 1 | 1 | 1 | 1 | 1 | 1 | 1 |
| Antioxidant[4] | 1 | 1 | 1 | 1 | 1 | 1 | 1 | 1 | 1 | 1 | 1 | 1 |
| Sulfur Cure Accelerator[5] | 1.00 | 0.50 | 0.90 | 0.45 | 0.75 | 0.38 | 1.20 | 0.60 | 1.20 | 0.60 | 1.20 | 0.60 |
| Sulfur | 1.80 | 0.90 | 2.00 | 1.00 | 2.25 | 1.12 | 1.50 | 1.00 | 1.50 | 1.00 | 1.50 | 1.00 |
| Dicumyl Peroxide, | — | 3.50 | — | 3.50 | — | 3.50 | — | 3.50 | — | 3.50 | — | 3.50 |

TABLE I-continued

| Example or Comparative Experiment | A | 1 | B | 2 | C | 3 | D | 4 | E | 5 | F | 6 |
|---|---|---|---|---|---|---|---|---|---|---|---|---|
| 40% Active | | | | | | | | | | | | |

REMARKS:
[1] Standard Malaysian Natural Rubber, Hydroxylamine Stabilized, SMR-5CV.
[2] Styrene Butadiene Rubber 1500; 23.5% Bound Styrene Mooney Viscosity (ML1 + 4) = 52.
[3] Ethylene-propylene-5-ethylidene-2-norborene terpolymer: E/P wt. ratio = 63/37; IV = 2.1 dl/g (decalin at 135° C.): Mooney Viscosity (ML-4 at 257° F.) = 60; I$_2$No. = 10.
[4] Polymerized trimethyl dihydroquinoline, Naugard [TM] Q, Uniroyal Chemical Company, Inc.
[5] N—t-butyl-2-benzothiuazolesulfenamide

TABLE II

| Example or Comparative Experiment | A | 1 | B | 2 | C | 3 | D | 4 | E | 5 | F | 6 |
|---|---|---|---|---|---|---|---|---|---|---|---|---|
| Room Temperature | | | | | | | | | | | | |
| 300% Modulus, psi | 810 | 1300 | 1110 | 1570 | 1340 | 1810 | 0 | 2120 | 1800 | 2080 | 1470 | 1820 |
| 300% Modulus, MPa | 5.6 | 9.0 | 7.6 | 10.8 | 9.2 | 12.5 | 0 | 14.6 | 12.4 | 14.3 | 10.1 | 12.5 |
| Tensile Strength, psi | 1210 | 3190 | 1420 | 2890 | 2020 | 2890 | 1700 | 3100 | 2620 | 3350 | 1590 | 3030 |
| Tensile Strength, MPa | 8.3 | 22.0 | 9.8 | 19.9 | 13.9 | 19.9 | 11.7 | 21.4 | 18.1 | 23.1 | 11.0 | 20.9 |
| Elongation, % at Break | 510 | 570 | 400 | 490 | 420 | 440 | 250 | 420 | 430 | 440 | 330 | 460 |
| Hardness, Shore A | 70 | 69 | 68 | 64 | 61 | 61 | 70 | 69 | 74 | 71 | 70 | 67 |
| 100° C. | | | | | | | | | | | | |
| 300% Modulus, psi | 0 | 680 | 510 | 730 | 590 | 730 | 0 | 1100 | 1070 | 1230 | 0 | 1070 |
| 300% Modulus, MPa | 0 | 4.7 | 3.5 | 5.0 | 4.1 | 5.0 | 0 | 7.6 | 7.4 | 8.5 | 0 | 7.4 |
| Tensile Strength, psi | 360 | 1410 | 510 | 1550 | 1160 | 1790 | 510 | 1330 | 1130 | 1340 | 570 | 1300 |
| Tensile Strength, MPa | 2.5 | 9.7 | 3.5 | 10.7 | 8.0 | 12.3 | 3.5 | 9.2 | 7.8 | 9.2 | 3.9 | 9.0 |
| Elongation, % at Break | 260 | 510 | 300 | 530 | 520 | 620 | 180 | 320 | 320 | 330 | 210 | 380 |
| Tan Delta (11 Hz) | | | | | | | | | | | | |
| 25° C. | .189 | .181 | .202 | .171 | .191 | .172 | .199 | .197 | .188 | .185 | .200 | .188 |
| 50° C. | .195 | .173 | .210 | .167 | .198 | .180 | .193 | .189 | .189 | .176 | .203 | .184 |
| 75° C. | .193 | .174 | .218 | .174 | .192 | .168 | .194 | .179 | .190 | .161 | .211 | .166 |
| 100° C. | .208 | .182 | .209 | .173 | .183 | .151 | .176 | .152 | .182 | .155 | .214 | .164 |
| 125° C. | .239 | .170 | .229 | .165 | .190 | .151 | .174 | .150 | .169 | .147 | .211 | .151 |

The above data indicate the desirable strength and elongation characteristics exhibited by the tread compositions employed in the tires of this invention. It is noted that these compositions exhibit greatly enhanced tensile strength and elasticity relative to prior art compositions cured with sulfur and a sulfur cure accelerator alone.

Moreover, the lower tan delta values at a frequency of 11 Hz at 25°-75° C. exhibited by the compositions of this invention, relative to those of the corresponding Comparative Experiment, are indicative of the superior rolling resistance exhibited by the tires of this invention. Further, the lower tan delta values at 75°-100° C. show the reduced heat buildup and improved durability exhibited by the compounds of the present invention.

EXAMPLE 7 AND COMPARATIVE EXPERIMENT G

Employing the mixing method described in the Examples above, two additional rubber blends were prepared. Their compositions (in parts by weight) are shown in Table III below.

TABLE III

| | G | 7 |
|---|---|---|
| NR[1] | 20 | 20 |
| HV-BR[2] | 30 | 30 |
| EPDM[3] | 50 | 50 |
| Extender Oil | 10 | 10 |
| Carbon Black | 50 | 50 |
| Zinc Oxide | 5 | 5 |
| Stearic Acid | 1 | 1 |
| Antioxidant[4] | 1 | 1 |
| Sulfur Cure Accelerator | 1.25 | 0.60 |
| Sulfur | 1.50 | 1.00 |

TABLE III-continued

| | G | 7 |
|---|---|---|
| Dicumyl Peroxide 40% Active | — | 3.50 |

[1] Standard Malaysian Natural Rubber, Hydroxylamine Stabilized, SMR-5CV
[2] HV-BR = Nipol-BR-1240, solution polymerized polybutadiene, 71% 1,2-vinyl, 19% 1,4-trans, 10% 1,4-cis; ML(1 + 4 at 100° C.) = 45.
[3] Ethylene-propylene-5-ethylidene-2-norbornene terpolymer: E/P wt. ratio = 63/37; IV = 2.1 dl/g (decalin at 135° C.): Mooney Viscosity (ML-4 at 257° F.) = 60; I$_2$ No. = 10.
[4] Polymerized trimethyl dihydroquinoline, Naugard [TM] Q, Uniroyal Chemical Company, Inc.
[5] N—t-butyl-2-benzothiazolesulfenamide Samples of these compositions were cured for 20 minutes at 170° C. and tested. Stress strain properties and dynamic properties were evaluated and the results are summarized in Table IV below.

TABLE IV

| Room Temperature | G | 7 |
|---|---|---|
| 300% Modulus, psi | 1300 | 1760 |
| 300% Modulus, MPa | 9.0 | 12.1 |
| Tensile Strength, psi | 1740 | 2990 |
| Tensile Strength, MPa | 12.0 | 20.6 |
| Elongation % at Break | 420 | 430 |
| Hardness, Shore A | 70 | 68 |
| Tan Delta, 11 Hz (Rheovibron) | | |
| 20° C. | 0.171 | 0.175 |
| 50° C. | 0.177 | 0.165 |
| 75° C. | 0.186 | 0.153 |
| 100° C. | 0.188 | 0.146 |

The data above further demonstrate that the tread compositions employed in the tires of this invention strength and elongation characteristics as well as improved dynamic properties.

The significance of the tan delta versus temperature data for Example 7 and comparison compound G is that Example 7 shows the type of behavior expected for well cured rubber whereas G shows evidence of incomplete or non-uniform vulcanization. The data for G indicate that most of the cross-linking occured in the highly unsaturated polymers leaving the EPDM seriously undercured.

EXAMPLE 8 AND COMPARATIVE EXPERIMENT H

Following essentially the preparation procedure of the previous examples, additional compounded stocks were prepared using the components listed in Table V.

TABLE V

| Example or Comparative Experiment | H | 8 |
| --- | --- | --- |
| NR[1] | 25 | 25 |
| Cis-BR[2] | 25 | 25 |
| EPDM[3] | 50 | 50 |
| Extender Oil (Circosol 4240) | 10 | 10 |
| Carbon Black, N-351 | 50 | 50 |
| Zinc Oxide | 5 | 5 |
| Antioxidant[4] | 1 | 1 |
| Stearic Acid | 1 | 1 |
| Sulfur Cure Accelerator[5] | 1.2 | 0.6 |
| Sulfur | 1.5 | 1.0 |
| Dicumyl Peroxide, 40% Active | — | 3.5 |

REMARKS:
[1]Standard Malaysian Natural Rubber, Hydroxylamine Stabilized, SMR-5CV
[2]Solution Polymerized Polybutadiene, 93% Cis-1,4; ML(1 + 4 at 100° C.) = 45
[3]Ethylene-propylene-5-ethylidene-2-norbornene terpolymer: E/P wt. ratio = 63/37; IV = 2.1 dl/g (decalin at 135° C.): Mooney Viscosity (ML-4 at 257° F.) = 60; $I_2$ No. = 10.
[4]Polymerized trimethyl dihydroquinoline, Naugard [TM] Q, Uniroyal Chemical Company, Inc.
[5]N—t-butyl-2-benzothiazolesulfenamide Samples of the materials of Comparative Experiments G-L and of Examples 1-6 were cured for 20 minutes and tested for their dynamic properties at temperatures ranging from 25° to 125° C., as measured on a direct reading from a Rheovibron Model Rheo-200. The results of such testing are summarized in Table VI below.

Samples of each of the above stocks were cured for 20 minutes at 170° C. and tested for their physical properties. The results of such testing are summarized in Table VI.

TABLE VI

| | H | 8 |
| --- | --- | --- |
| 300% Modulus, psi | 950 | 1310 |
| Tensile Strength, psi | 1470 | 2860 |
| Elongation % at Break | 440 | 520 |
| Shore A | 67 | 66 |
| Tan Delta, 11 Hz | | |
| 30° | 0.160 | 0.149 |
| 50° | 0.170 | 0.149 |
| 75° | 0.180 | 0.147 |
| 100° | 0.197 | 0.145 |
| Goodrich Flexometer ASTM D623-78 Method A | | |
| Heat Buildup | Blew Apart after 5 minutes | 85° C. |
| Present Set | — | 7.7 |

The above results once again demonstrate the superior properties of the tread compositions of this invention.

What is claimed is:

1. A tire having a tread having reduced heat buildup as measured by tan delta, said tread being composed of a composition formed by curing a blend comprised of:
   (a) between about 30 and about 50 parts ethylenepropylene-5-ethylidene-2-norbornene terpolymer with an ethylene/propylene ratio range of about 60:40 to about 80:20 and about 1 to 15 weight percent 5-ethylidene-2-norbornene;
   (b) between about 70 and about 50 parts of at least one highly unsaturated rubber selected from the group consisting of natural rubber, synthetic polyisoprene, styrene-butadiene rubber, and polybutadiene rubber;
   (c) between 0.2 and 5 parts sulfur;
   (d) between 0.1 and 5 parts of a sulfur cure accelerator; and
   (e) an organic peroxide curative, wherein said sulfur is present at a level of between about 0.5 and about 200 gram atoms of sulfur per mole of peroxide;
   wherein the tan delta value between 25° C. and 125° C. for said composition is lower than the value when said organic peroxide curative is replaced by twice the levels of sulfur and sulfur cure accelerator, all parts being by weight based on the combined total of (a) and (b).

2. A tire according to claim 1 wherein said sulfur is present at a level of between about 6 and 14 gram atoms of sulfur per mole of peroxide.

3. The tire of claim 11 further comprising between 2 and 10 parts by weight of zinc oxide.

4. The tire of claim 1 further comprising an antioxidant.

5. The tire of claim 1 wherein said sulfur cure accelerator is selected from the group consisting of thiazole and sulfenamides.

6. The tire of claim 1 wherein said sulfur cure accelerator is a benzothiazolesulfenamide.

* * * * *